United States Patent
Karmarkar et al.

(10) Patent No.: US 8,799,223 B1
(45) Date of Patent: Aug. 5, 2014

(54) TECHNIQUES FOR DATA BACKUP MANAGEMENT

(75) Inventors: Saurabh Sitaram Karmarkar, Pune (IN); Ganesh Prabhakar Tambat, Pune (IN); Aswad Shrikrishna Kulkarni, Pune (IN)

(73) Assignee: Symantec Corporation, Mountain View, CA (US)

( * ) Notice: Subject to any disclaimer, the term of this patent is extended or adjusted under 35 U.S.C. 154(b) by 158 days.

(21) Appl. No.: 13/098,966

(22) Filed: May 2, 2011

(51) Int. Cl.
*G06F 17/00* (2006.01)
*G06F 7/00* (2006.01)

(52) U.S. Cl.
USPC ............ 707/640; 707/646; 711/161; 711/162

(58) Field of Classification Search
None
See application file for complete search history.

(56) References Cited

U.S. PATENT DOCUMENTS

| | | | |
|---|---|---|---|
| 6,240,374 B1* | 5/2001 | Cramer et al. | 506/8 |
| 2009/0113545 A1* | 4/2009 | Pic et al. | 726/22 |
| 2010/0332454 A1* | 12/2010 | Prahlad et al. | 707/654 |
| 2010/0332456 A1* | 12/2010 | Prahlad et al. | 707/664 |
| 2010/0332479 A1* | 12/2010 | Prahlad et al. | 707/741 |
| 2010/0333116 A1* | 12/2010 | Prahlad et al. | 719/328 |

\* cited by examiner

*Primary Examiner* — Angelica Ruiz
(74) *Attorney, Agent, or Firm* — Wilmer Cutler Pickering Hale and Dorr LLP (57) ABSTRACT

Techniques for data backup management are disclosed. In one particular exemplary embodiment, the techniques may be realized as a method for data backup management comprising identifying a base image for a plurality of data backup endpoints, creating, using at least one computer processor, a backup of the base image, storing the backup of the base image as a common backup for the plurality of data backup endpoints, and tracking changes to the base image at one or more of the plurality of data backup endpoints.

16 Claims, 4 Drawing Sheets

TECHNIQUES FOR DATA BACKUP MANAGEMENT

FIELD OF THE DISCLOSURE

The present disclosure relates generally to data backups and, more particularly, to techniques for data backup management.

BACKGROUND OF THE DISCLOSURE

Data backup in large environments may contain a large amount of redundant data. For example, a large enterprise may backup endpoints (e.g., laptops, desktops, smartphones, servers, etc.). Endpoints may use a same operating system, a same set of applications, same utilities, and/or other common data. Backing up each of these endpoints may require processing at each endpoint, network bandwidth between the endpoint and storage, processing at a backup server, and/or processing and storage at a storage device.

Enterprises or other entities facing usage of resources for redundant data may use deduplication technology to reduce an amount of redundant data backed up. However, deduplication technology may require that every endpoint (e.g., the employee devices targeted for backup) calculate a fingerprint identifying a file and use this fingerprint to determine whether a file is a duplicate.

In view of the foregoing, it may be understood that there may be significant problems and shortcomings associated with current data backup management technologies.

SUMMARY OF THE DISCLOSURE

Techniques for data backup management are disclosed. In one particular exemplary embodiment, the techniques may be realized as a method for data backup management comprising identifying a base image for a plurality of data backup endpoints, creating, using at least one computer processor, a backup of the base image, storing the backup of the base image as a common backup for the plurality of data backup endpoints, and tracking changes to the base image at one or more of the plurality of data backup endpoints.

In accordance with other aspects of this particular embodiment, the techniques may further include distributing the base image to at least one of the plurality of data backup endpoints.

In accordance with further aspects of this particular embodiment, the distribution may comprise restoring the at least one of the plurality of data backup endpoints using the backup of the base image.

In accordance with additional aspects of this particular embodiment, the backup of the base image may be stored on cloud based storage.

In accordance with additional aspects of this particular embodiment, the techniques may further comprise distributing a change tracking driver to at least one of the plurality of data backup endpoints.

In accordance with additional aspects of this particular embodiment, the techniques may further comprise backing up at least one of the plurality of data backup endpoints, wherein a backup comprises at least one tracked change of the at least one of the plurality of data backup endpoints and wherein the stored backup of the base image allows backup processing to perform an incremental backup skipping backup of unchanged backup image files on the at least one of the plurality of data backup endpoints.

In accordance with additional aspects of this particular embodiment, the techniques may further comprise collapsing a plurality of incremental backups for a data backup endpoint into a synthetic incremental.

In accordance with additional aspects of this particular embodiment, the techniques may further comprise collapsing a plurality of incremental backups for a data backup endpoint and the backup of the base image into a full backup.

In accordance with additional aspects of this particular embodiment, the techniques may further comprise distributing a deduplication agent to at least one of the plurality of data backup endpoints.

In accordance with additional aspects of this particular embodiment, the techniques may further comprise calculating a fingerprint for one or more files of the base image and distributing the calculated fingerprint to at least one of the plurality of data backup endpoints.

In accordance with additional aspects of this particular embodiment, the calculated fingerprint may comprise a hash file.

In accordance with additional aspects of this particular embodiment, the techniques may further comprise using the calculated fingerprint to deduplicate a backup of the at least one of the plurality of data backup endpoints.

In accordance with additional aspects of this particular embodiment, the techniques may be realized as at least one non-transitory processor readable non-transitory storage medium for storing a computer program of instructions configured to be readable by at least one processor for instructing the at least one processor to execute a computer process for performing the method.

In another particular embodiment, the techniques may be realized as an article of manufacture for data backup management, the article of manufacture comprising at least one non-transitory processor readable medium and instructions stored on the at least one medium. The instructions may be configured to be readable from the at least one medium by at least one processor and thereby cause the at least one processor to operate so as to identify a base image for a plurality of data backup endpoints, create, using at least one computer processor, a backup of the base image store the backup of the base image as a common backup for the plurality of data backup endpoints, and track changes to the base image at one or more of the plurality of data backup endpoints.

In yet another particular embodiment, the techniques may be realized as a system for data backup management comprising one or more processors communicatively coupled to a network, wherein the one or more processors are configured to identify a base image for a plurality of data backup endpoints, create, using at least one computer processor, a backup of the base image, store the backup of the base image as a common backup for the plurality of data backup endpoints, and track changes to the base image at one or more of the plurality of data backup endpoints.

In accordance with additional aspects of this particular embodiment, the one or more processors may further be configured to distribute the base image to at least one of the plurality of data backup endpoints.

In accordance with additional aspects of this particular embodiment, the distribution may comprise restoring the at least one of the plurality of data backup endpoints using the backup of the base image.

In accordance with additional aspects of this particular embodiment, the backup of the base image may be stored on cloud based storage.

In accordance with additional aspects of this particular embodiment, the one or more processors may further be configured to back up at least one of the plurality of data backup endpoints, wherein a backup comprises at least one tracked change of the at least one of the plurality of data backup endpoints and wherein the stored backup of the base image allows backup processing to perform an incremental backup skipping backup of unchanged backup image files on the at least one of the plurality of data backup endpoints.

In accordance with additional aspects of this particular embodiment, the one or more processors may further be configured to calculate a fingerprint for one or more files of the base image, and distribute the calculated fingerprint to at least one of the plurality of data backup endpoints.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
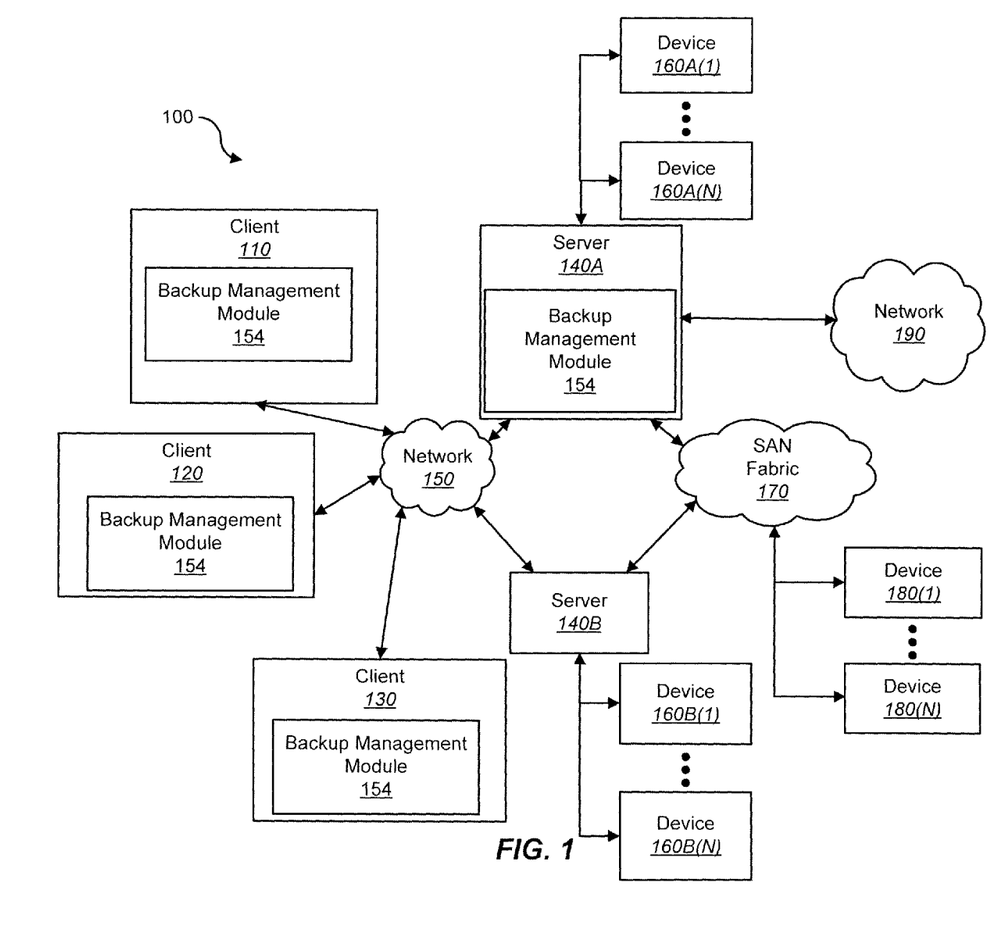
FIG. 1 shows a block diagram depicting a network architecture for data backup management in accordance with an embodiment of the present disclosure.

FIG. 1 shows a block diagram depicting a network architecture 100 for data backup management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., data backup management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for data backup management that may include one or more modules.

As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
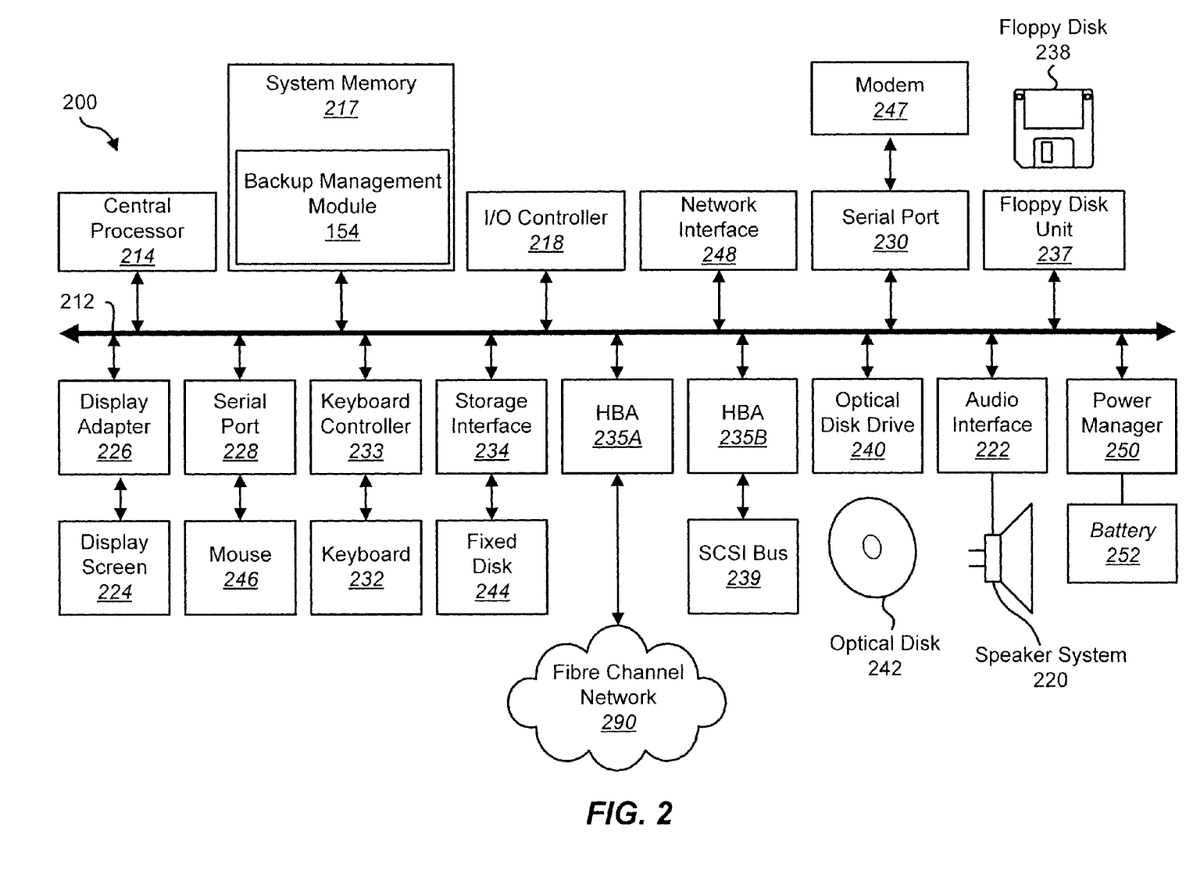
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B (1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for deduplicating, backing up and/or archiving data. One or more portions of data may be deduplicated, backed up, and/or archived based on a backup policy and/or an archive applied, attributes associated with the data source, space available for backup, space available at the data source, or other factors.

According to some embodiments, clients 110, 120, and/or 130 may contain one or more portions of software for data backup management such as, for example, data backup management module 154. One or more portions of data backup management module 154 may reside at a network centric location. For example, server 140A may be a server, a firewall, a proxy server, a gateway, a search engine, or other network element that may perform one or more actions to provide data backup management. According to some embodiments, network 190 may be an external network (e.g., the Internet) and server 140A may be a gateway, a proxy server, a search engine, and/or a firewall between one or more internal components and clients and the external network.

According to some embodiments, data backup management module 154 may be implemented in several portions which may be co-located or located remote from one another. According to one or more embodiments, data backup management may be performed by a third party (e.g., a service provider).

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

According to some embodiments, clients 110, 120, and 130 may contain backup management module 154. Backup management module 154 may provide one or more backup management services.

Backup management module 154 may identify and/or generate a common base image containing files common to a plurality of endpoints (e.g., clients 110, 120, and 130). According to some embodiments, one or more portions of backup management module 154 may be implemented on server 140A and/or 140B. Backup management module 154 may provide a user interface allowing selection of data to be contained in a base image. As an example, a base image may contain an operating system used by a plurality of backup endpoints (e.g., employee devices and/or servers being backed up in an enterprise environment.) A base image may also contain other data that is common across the plurality of endpoints (e.g., corporate approved applications, utilities, and/or data). Generation of a base image may also include security software updates, patches, and/or new software deployments. Backup management module 154 may deploy the base image to a plurality of endpoints. Backup management module 154 may generate a backup of a base image. According to some embodiments, Backup management module 154 may perform a restore operation using the backup image to deploy the base image to the plurality of endpoints. According to some embodiments, a backup of the base image may be stored once (e.g., on cloud based storage and/or a storage area network) and may eliminate a need for endpoints using the base image to backup data in the base image. For example, server 140A may be a media server or a backup server containing backup management module 154. The base image may be distributed by server 140A to clients 110, 120, and/or 130. Subsequent backups of clients 110, 120, and/or 130 may be incremental backups which may contain only changes to a base image and may not require transmission of, processing, and/or storage of data contained in a base image which has not been modified.

Endpoints which may have different hardware or different software needs may have incremental backups generated containing additional data supporting the different hardware and/or software needs. These incremental backups may be applied to the endpoints having different hardware and/or software needs during deployment (e.g., a restore operation for some clients may include the base image backup and an incremental backup containing data specific to an endpoint such as, for example, additional drivers for additional hardware.)

According to some embodiments, backup management module 154 on clients 110, 120, and/or 130 may contain a change tracking module (e.g., a driver) which may track modifications to a base image on an endpoint. This change tracking driver may be distributed to an endpoint as part of a distribution of a base image. After distribution, an endpoint may boot. Once an endpoint boots, a change tracking driver may begin tracking changes to a base image of the endpoint. According to some embodiments, an endpoint may contain a change tracking driver (e.g., as part of a prior install of backup software) which may be utilized to track modifications to a base image.

According to some embodiments, backup management module 154 may calculate a fingerprint for one or more files of a base image. For example, backup management module 154 of server 140A may generate fingerprints for each file of a base image. Generated fingerprints may be distributed with a base image. An endpoint performing deduplication save significant processing by not having to generate fingerprints for files in a base image. According to some embodiments, a fingerprint may be a hash file (e.g., a MD5 hash file). According to at least one embodiment, a deduplication agent may be provided with a base image. For example, a base image provided from a server may have deduplication agent incorporated into and/or transmitted to one or more endpoints with a base image.

If a full backup is not performed and endpoints rely on a centralized backup of a base image and incremental backups, a chain of incremental backups may grow over time. According to at least one embodiment, incremental backups may be collapsed periodically or on demand into synthetic incremental backups. In some embodiments, incremental backups and a copy of the base image backup may be collapsed into a synthetic full backup.

According to some embodiments, additional steps may be performed to update an existing base image previously deployed. The prior base backup image (i.e., a parent image) may be deployed on an endpoint. Updates may be performed on the endpoint (e.g., security software updates, patches, new software deployments, etc.). A change tracking module or driver may keep track of one or more of the changes to the prior base backup image. A new incremental backup may be generated from this endpoint by using the tracked changes. Fingerprints corresponding to the changed files may also be generated and the new incremental backup image may contain and/or be deployed with the new fingerprints (e.g., for endpoints which use deduplication). According to some embodiments, the fingerprints may be stored in an endpoints fingerprints database. In order to deploy this new parent base image to one or more additional endpoints, this new incremental base image may be restored on top of the prior parent base image. This may allow upgrading to a new base image for endpoints using the new incremental. This may also allow coexistence of an old base parent image and the new incremental base image (e.g., perhaps clients are being upgraded in increments).

According to some embodiments, an existing group of backup endpoints (e.g., backup client devices) may have an older base image installed and may also each have older incremental backup chains generated depending on that older base image. Older endpoints with one or more associated incremental backups may be migrated to a new base image. An incremental backup may be taken using existing backup software for the endpoint. A snapshot of the older endpoint may be taken. This may ensure that backups are intact up to a current point of a snapshot. A comparison between the snapshot and a new common base image backup (e.g., a new base image that the older endpoint is being migrated to) may be performed by using file level comparison and/or file level fingerprints. A delta incremental file may be generated using this comparison. This delta incremental may provide a transition from the prior existing base image to the new base image. Additionally, change tracking which may be started following the snapshot may now provide an incremental backup which may be consistent with an old chain of incremental backups as well as a new chain generated by change tracking following the snapshot. According to embodiments using deduplication, generated fingerprints for the files changed in the delta incremental may be embedded into the delta incremental. This may reduce a burden on deduplication software since the deduplication software may not have to generate fingerprints. This may be a onetime process, which may be done at a convenient time when the CPU/network load is negligible (e.g., overnight or on the weekend.) Once the migration is done, the old endpoints may now keep tracking and taking incremental backups with respect to a common base backup image which may be stored on the cloud. This may allow migration and reduce backup storage and processing as well as deduplication processing.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, data backup management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
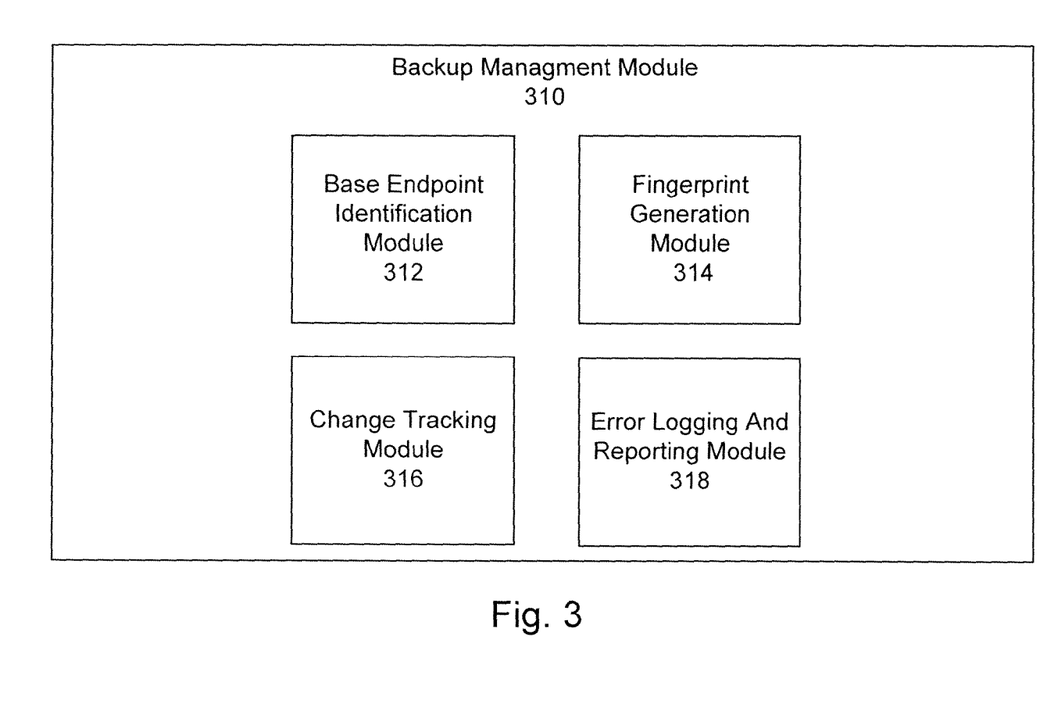
FIG. 3 shows a module for data backup management in accordance with an embodiment of the present disclosure.

Referring to FIG. 3, there is shown a data backup management module 310 in accordance with an embodiment of the present disclosure. As illustrated, the data backup management module 310 may contain one or more components including base endpoint identification module 312, fingerprint generation module 314, change tracking module 316, and error logging and reporting module 318.

Base endpoint identification module 312 may identify and/or generate a common base image containing files common to a plurality of endpoints (e.g., clients 110, 120, and 130 of FIG. 1). Base endpoint identification module 312 may provide a user interface allowing selection of data to be contained in a base image. As an example, a base image may contain an operating system used by a plurality of backup endpoints (e.g., employee devices and/or servers being backed up in an enterprise environment.) A base image may also contain other data that is common across the plurality of endpoints (e.g., corporate approved applications, utilities, and/or data). Generation of a base image may also include security software updates, patches, and/or new software deployments. Base endpoint identification module 312 may deploy the base image to a plurality of endpoints. Base endpoint identification module 312 may generate a backup of a base image. According to some embodiments, base endpoint identification module 312 may perform a restore operation using the backup image to deploy the base image to the plurality of endpoints. According to some embodiments, a backup of the base image may be stored once (e.g., on cloud based storage and/or a storage area network) and may eliminate a need for endpoints using the base image to backup data in the base image.

Endpoints which may have different hardware or different software needs may have incremental backups generated containing additional data supporting the different hardware and/or software needs. These incremental backups may be applied by base endpoint identification module 312 to the endpoints having different hardware and/or software needs during deployment (e.g., a restore operation for some endpoints may include the base image backup and an incremental backup containing data specific to an endpoint such as, for example, additional drivers for additional hardware.)

Base endpoint identification module 312 may also perform comparisons and other processing allowing migration of existing endpoints to new base images.

Fingerprint generation module 314 may calculate a fingerprint for one or more files of a base mage. For example, fingerprint generation module 314 may generate fingerprints for each file of a base image. Generated fingerprints may be distributed with a base image. An endpoint performing deduplication save significant processing by not having to generate fingerprints for files in a base image. According to some embodiments, a fingerprint may be a hash file (e.g., a MD5 hash file). According to at least one embodiment, a deduplication agent may be provided with a base image. For example, a base image provided from base endpoint identification module 312 may have a deduplication agent incorporated into and/or transmitted to one or more endpoints with a base image.

Change tracking module 316 may track modifications to a base image on an endpoint. Change tracking module 316 may be distributed to an endpoint as part of a distribution of a base image. After distribution, an endpoint may boot. Once an endpoint boots, change tracking module 316 may begin tracking changes to a base image of the endpoint.

Error logging and reporting module 318 may produce logs, reports, or other information associated with data backup management.

Figure 4:
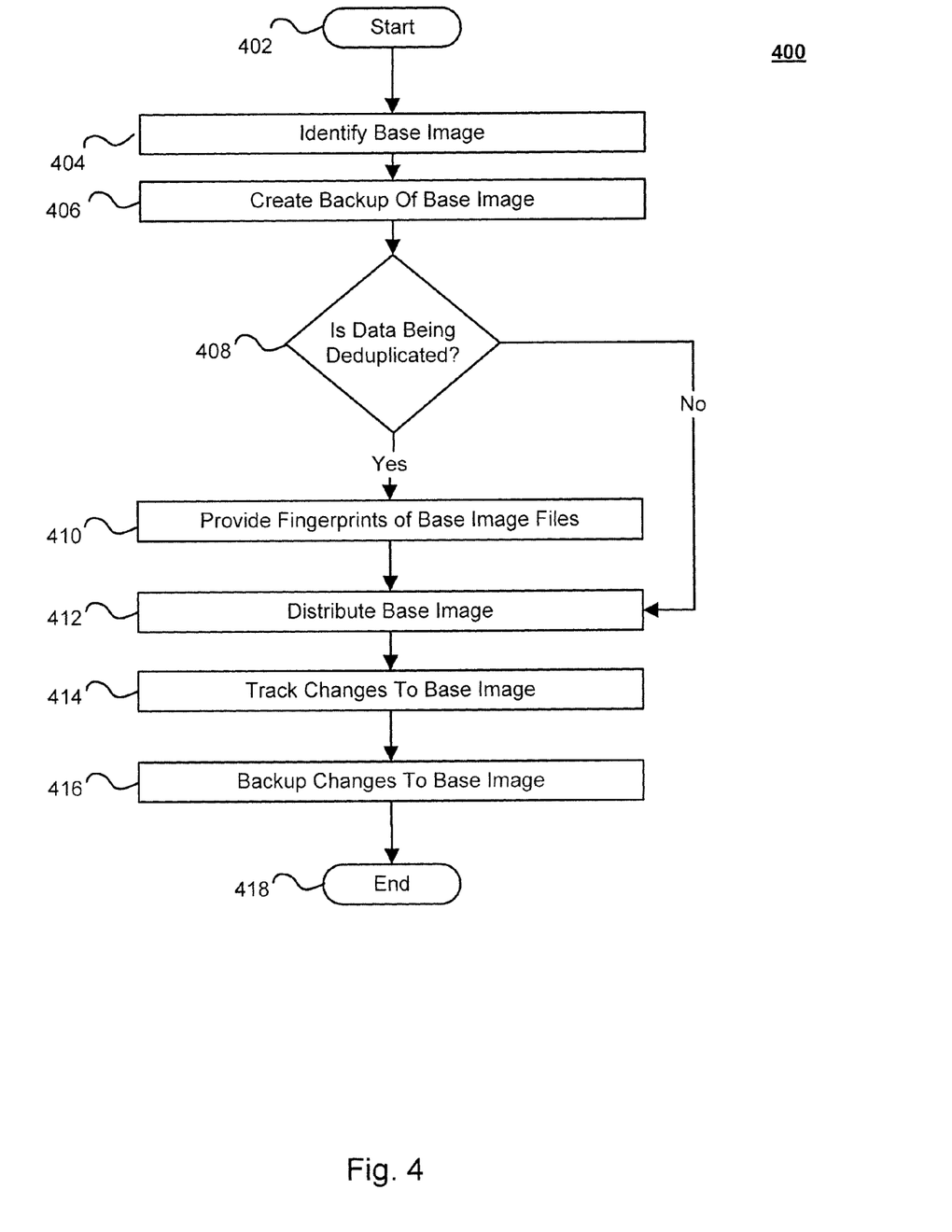
FIG. 4 depicts a method for data backup management in accordance with an embodiment of the present disclosure.

Referring to FIG. 4, there is depicted a method 400 for data backup management in accordance with an embodiment of the present disclosure. At block 402, the method 400 may begin.

At block 404 a base image may be identified and/or generated. A user interface may be provided allowing selection of data to be contained in a base image. As an example, a base image may contain an operating system used by a plurality of backup endpoints (e.g., employee devices and/or servers being backed up in an enterprise environment.) A base image may also contain other data that is common across the plurality of endpoints (e.g., corporate approved applications, utilities, and/or data). Generation of a base image may also include security software updates, patches, and/or new software deployments.

At block 406 a backup of a base image may be performed.

At block 408 it may be determined whether data is being deduplicated for one or more endpoints. If data is being deduplicated, the method may continue at block 410. If data is not being deduplicated, the method may continue at block 412.

At block 410, fingerprints (e.g., a hash value for each file) may be generated for the base image. Fingerprints for the base image may be distributed. According to some embodiments, fingerprints may be embedded in and/or distributed with a base image.

At block 412 a base image may be distributed to one or more endpoints. According to some embodiments, base image may be distributed by performing a restore operation using a backup of the base image and backup software. A change tracking driver and/or fingerprints of base image files may also be distributed as part of the restoration.

At block 414, changes to a base image may be tracked at each endpoint using a change tracking driver.

At block 416, changes to a base image may be backed up as an incremental backup storing modifications to a base image at an endpoint.

At block 418, the method may end.

At this point it should be noted that data backup management in accordance with the present disclosure as described above typically involves the processing of input data and the generation of output data to some extent. This input data processing and output data generation may be implemented in hardware or software. For example, specific electronic components may be employed in a data backup management module or similar or related circuitry for implementing the functions associated with data backup management in accordance with the present disclosure as described above. Alternatively, one or more processors operating in accordance with instructions may implement the functions associated with data backup management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:
1. A method for data backup management comprising:
 identifying a base image for a plurality of data backup clients;
 creating, using at least one computer processor, a backup of the base image;
 storing the backup of the base image as a stored common backup for the plurality of data backup clients;

calculating, at a server, a fingerprint for one or more files of the base image;

distributing the calculated fingerprint from the server to at least one of the plurality of data backup clients;

tracking changes to the base image at one or more of the plurality of data backup clients; and backing up at least one of the plurality of data backup clients, wherein a resultant backup of the at least one of the plurality of data backup clients comprises at least one tracked change of the at least one of the plurality of data backup clients, and wherein the stored common backup of the base image allows backup processing to perform an incremental backup which skips backup of unchanged files on the at least one of the plurality of data backup clients.

2. The method of claim 1, further comprising distributing the base image to at least one of the plurality of data backup clients.

3. The method of claim 2, wherein the distribution comprises restoring the at least one of the plurality of data backup clients using the backup of the base image.

4. The method of claim 1, wherein the backup of the base image is stored on cloud based storage.

5. The method of claim 1, further comprising distributing a change tracking driver to at least one of the plurality of data backup clients.

6. The method of claim 1, further comprising collapsing a plurality of incremental backups for a data backup client into a synthetic incremental.

7. The method of claim 1, further comprising collapsing a plurality of incremental backups for a data backup client and the backup of the base image into a full backup.

8. The method of claim 1, further comprising distributing a deduplication agent to at least one of the plurality of data backup clients.

9. The method of claim 1, wherein the calculated fingerprint comprises a hash file.

10. The method of claim 1, further comprising:
using the calculated fingerprint to deduplicate a backup of the at least one of the plurality of data backup clients.

11. The method of claim 1, wherein the calculated fingerprint comprises a fingerprint calculated using a MD5 hash function algorithm.

12. An article of manufacture for data backup management, the article of manufacture comprising:
at least one non-transitory processor readable medium; and
instructions stored on the at least one medium;
wherein the instructions are readable from the at least one medium by at least one processor and thereby cause the at least one processor to operate so as to:
identify a base image for a plurality of data backup clients;
create a backup of the base image;
store the backup of the base image as a stored common backup for the plurality of data backup clients;
calculate, at a server, a fingerprint for one or more files of the base image;
distribute the calculated fingerprint from the server to at least one of the plurality of data backup clients;
track changes to the base image at one or more of the plurality of data backup clients; and
back up at least one of the plurality of data backup clients, wherein a resultant backup of the at least one of the plurality of data backup clients comprises at least one tracked change of the at least one of the plurality of data backup clients and wherein the stored common backup of the base image allows backup processing to perform an incremental backup which skips backup of unchanged files on the at least one of the plurality of data backup clients.

13. A system for data backup management comprising:
one or more processors communicatively coupled to a network; wherein the one or more processors are configured to:
identify a base image for a plurality of data backup clients;
create, using at least one computer processor, a backup of the base image;
store the backup of the base image as a stored common backup for the plurality of data backup clients;
calculate, at a server, a fingerprint for one or more files of the base image;
distribute the calculated fingerprint from the server to at least one of the plurality of data backup clients;
track changes to the base image at one or more of the plurality of data backup clients; and
back up at least one of the plurality of data backup clients, wherein a resultant backup of the at least one of the plurality of data backup clients comprises at least one tracked change of the at least one of the plurality of data backup clients and wherein the common stored backup of the base image allows backup processing to perform an incremental backup which skips backup of unchanged files on the at least one of the plurality of data backup clients.

14. The system of claim 13, wherein the one or more processors are further configured to:
distribute the base image to at least one of the plurality of data backup clients.

15. The system of claim 14, wherein the distribution comprises restoring the at least one of the plurality of data backup clients using the backup of the base image.

16. The system of claim 13, wherein the backup of the base image is stored on cloud based storage.

* * * * *